United States Patent [19]

Hiestand

[11] Patent Number: 4,686,757
[45] Date of Patent: Aug. 18, 1987

[54] MACHINE TOOL CHUCK CONSTRUCTION

[75] Inventor: Karl Hiestand, Pfullendorf, Fed. Rep. of Germany

[73] Assignee: SMW Schneider & Weisshaupt GmbH, Fed. Rep. of Germany

[21] Appl. No.: 819,813

[22] Filed: Jan. 16, 1986

[30] Foreign Application Priority Data

Jan. 17, 1985 [DE] Fed. Rep. of Germany ....... 3501325

[51] Int. Cl.⁴ .......................................... B23Q 3/156
[52] U.S. Cl. ....................................... 29/568; 82/2.5
[58] Field of Search ............. 29/568, 26 A; 279/1 TS; 82/2.5, 2.7

[56] References Cited

U.S. PATENT DOCUMENTS

| | | | |
|---|---|---|---|
| 3,744,125 | 7/1973 | Schalles | 29/568 |
| 3,779,110 | 12/1973 | Harman et al. | 82/2.5 |
| 4,100,671 | 7/1978 | Junike et al. | 29/568 |
| 4,313,252 | 2/1982 | Kusha et al. | 29/568 |
| 4,532,692 | 8/1985 | Miyachi | 29/568 |

FOREIGN PATENT DOCUMENTS

| | | | |
|---|---|---|---|
| 2610587 | 9/1977 | Fed. Rep. of Germany | 29/568 |
| 2624775 | 12/1977 | Fed. Rep. of Germany | 29/568 |
| 2805828 | 8/1979 | Fed. Rep. of Germany | 29/568 |
| 2813832 | 10/1979 | Fed. Rep. of Germany | 279/123 |
| 55-5273 | 1/1980 | Japan | 29/568 |

Primary Examiner—William R. Briggs
Attorney, Agent, or Firm—McGlew and Tuttle

[57] ABSTRACT

A chuck for machine tools has basic jaws which engage with attachment jaws which are exchangeably retained and can be fed by means of a pallet and attached through a relative rotation mechanism between the jaws, each basic jaw is provided on its face with a specially shaped projection and each attachment jaw is provided with a corresponding, laterally open recess. The radially oriented surfaces of these parts are concentric to the longitudinal axis of the chuck body and furthermore, the attachment jaws are locked to the basic jaws secure against rotation by a holding member in a chucking position. This makes it possible to exchange the attachment jaws easily and quickly with the aid of machine motions and, in addition, there is an assurance of safe support of the attachment jaws on the basic jaws.

9 Claims, 7 Drawing Figures

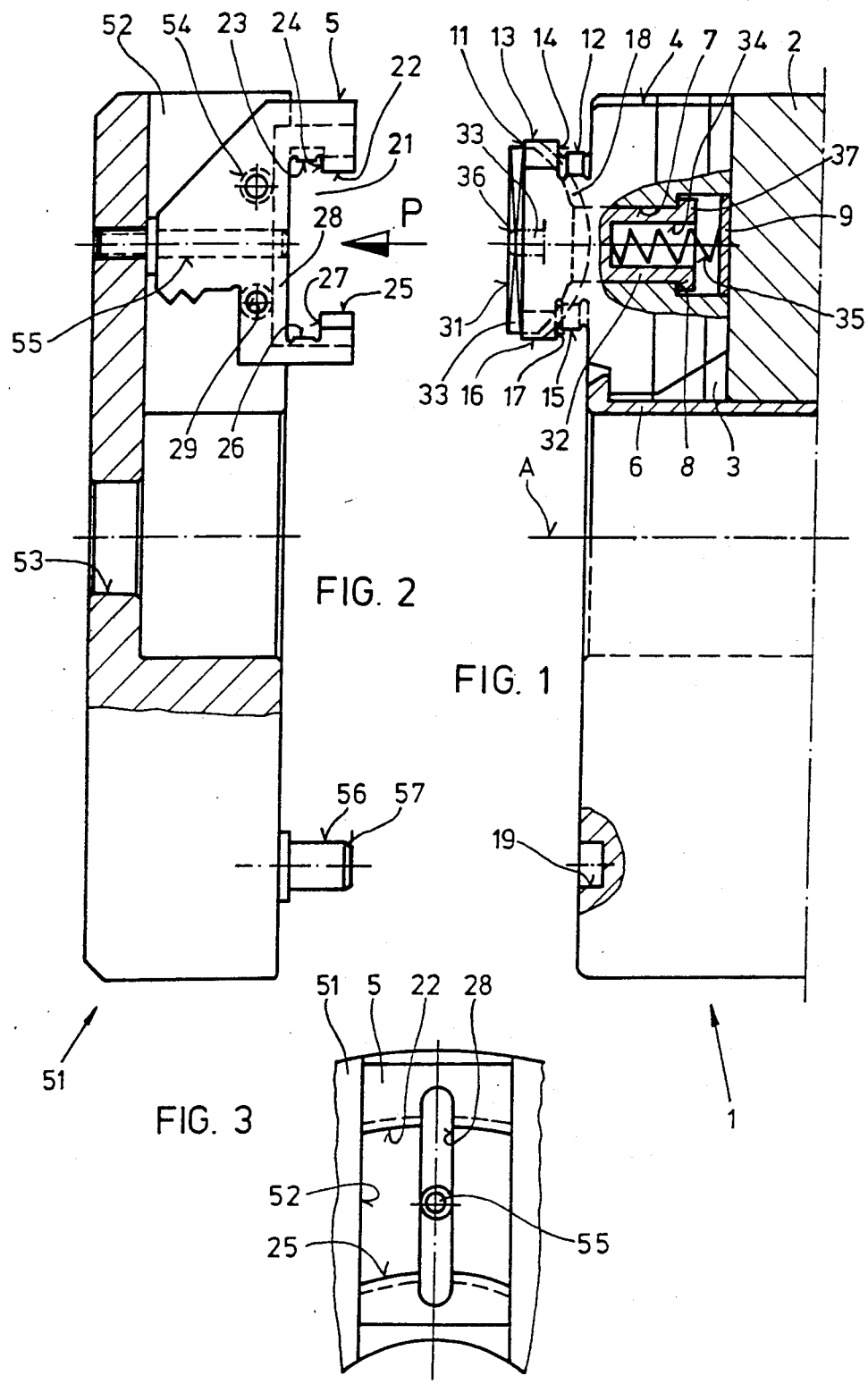

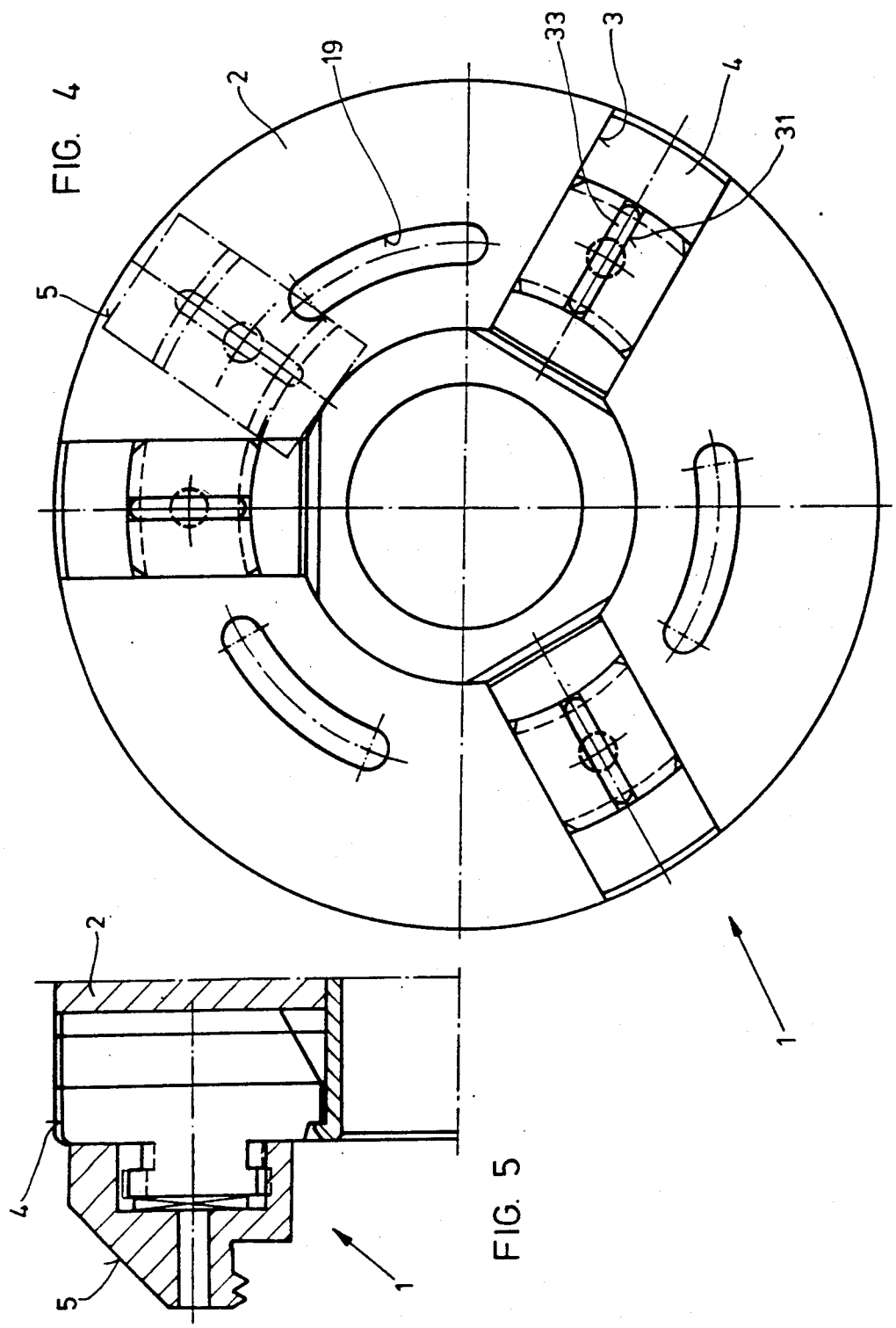

FIG. 7
FIG. 6
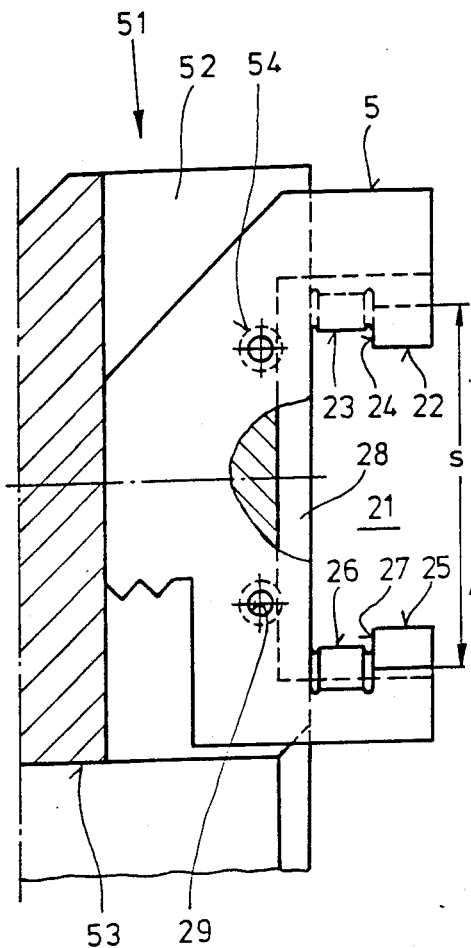
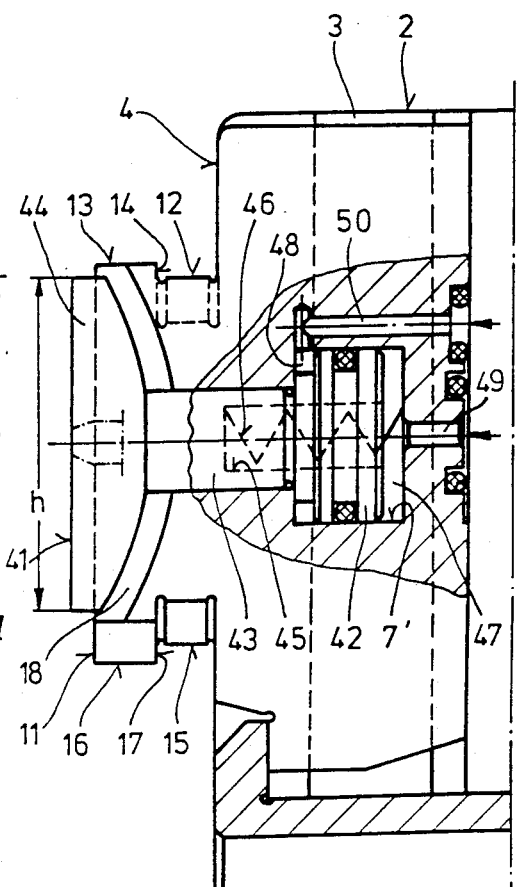

MACHINE TOOL CHUCK CONSTRUCTION

FIELD AND BACKGROUND OF THE INVENTION

This invention relates in general to machine tools and in particular to a new and useful machine tool chuck which has basic jaws and exchangeable jaws which are mounted to be easily exchangeable therewith.

The invention relates in general to chucks and in particular to a new and useful machine tool chuck on whose basic jaws, radially adjustable in the chuck, there are exchangeably held attachment jaws which are feedable by means of a pallet and attachable to the basic jaws through a relative rotation between the pallet and the chuck body.

A similar chuck is known from German AS No. 28 13 832. The attachment jaws of the device are guided in dovetail ways with guide surfaces which are transverse to the adjusting direction, are designed as concial surface segments concentric to the longitudinal axis of the chuck body, and between which a free plug-in play is provided. Furthermore, to fix the attachment jaws without play to the basic jaws, a clamping and locking device is required, an alignment surface of which interacts with an alignment member and is movably guided in a recess of the basic jaw, and its end, designed as conical bolt, can be pushed by the force of a spring against the attachment jaw and has a locking member movable into the attachment jaw. The aligning member as well as the locking member are actuated by moving the basic jaws via an actuating drive.

While the attachment jaws of this jaw chuck can be exchanged automatically for both inside and outside chucking, the design is extremely costly. But above all it is disadvantageous that the attachment jaws are tied to the basic jaws only through the force of a compression spring supported by the basic jaws and the alignment member so that a satisfactory detention is not provided. Furthermore, it is easy for the attachment jaws to be pulled off the conically designed bearing surfaces of the basic jaws by tilting forces acting upon the attachment jaws.

SUMMARY OF THE INVENTION

The invention provides a chuck of this kind described, by means of which an exchange of the attachment jaws can be accomplished readily and quickly, making use of motions which can be performed by the machine tool on which the chuck is mounted. In addition, a secure support of the attachment jaws at great stability should be provided so that great forces can be absorbed also, without damage occurring. Moreover, only a few components economically producible without difficulties should be required to make possible in a simple manner a rigid connection between an attachment jaw and a basic jaw for both inside and outside chucking.

According to the invention, this is achieved in a chuck with each basic jaw provided on its face facing the attachment jaw with a projection designed in T or L-shape, and that each attachment jaw is provided with a recess which is coordinated with the projection. The attachment jaw is open, at least on one long side, and has radially oriented outer and inner surfaces as well as the bearing surfaces disposed between them and perpendicular to the axis which are concentric to the longitudinal axis of the chuck body in the attaching position of the attachment jaws and that, in the chucking position of the attachment jaws, they are lockable to the basic jaws secure against rotation.

To lock the attachment jaws to the basic jaws secure against rotation there may be installed in them a holding member which is axially adjustable within limits and can latch, in the chucking position of the attachment jaws, into a seating slot provided in the attachment jaws face facing the basic jaw.

In a simple embodiment, the holding member advantageously comprises a detent bolt inserted in a hole centrically drilled in the basic jaws and of a sliding block which is disposed at the free end of the detent bolt and engages the seating slot of the attachment jaw and is preferably rectangular; but it is also possible to form the holding member of a piston, to which pressure medium can be admitted from both sides and which is installed in a hole centrically drilled in the basic jaw, and of a sliding block which is disposed at the piston rod of said piston, engages the seating slot of the attachment jaw and is preferably rectangular, the sliding blocks each being guided in a recess in the basic jaw so as to be secure against rotation. To facilitate their installation, the sliding blocks and/or the attachment jaw recesses accommodating them should be provided with pilot bevels preferably machined along their long sides.

To assure adequate areal, lateral support of the attachment jaws, the height of the sliding blocks should further nearly match the inside width of the recesses machined into the attachment jaws. Designing the sliding blocks in wedge shape achieves that the attachment jaws are always mounted securely to the basic jaws. Therefore, the attachment jaws can neither be turned out of the basic jaw recesses in circumferential direction, nor are they rotated by the given clearance about the longitudinal axis of the basic jaws.

To set the relative rotary travel between the chuck body and the pallet it is further advisable to machine into one of these components, preferably into the chuck body, one or more slots running concentric to its longitudinal axis and to provide on the other component projecting bolts engaging the slots, the point of the bolts having a preferably conical pilot bevel.

For easy removal of the attachment jaws from the pallet it is also expedient to provide in the pallet spring detents, by means of which the attachment jaws are detachably held.

The chuck designed in accordance with the invention does not only make it possible to exchange the attachment jaws quickly by utilizing machine motions which can be performed by the machine tool on which the chuck is mounted, it is also simple in design, and can, therefore, be produced economically. But above all there is assurance that great stability is provided at all times and that also great chucking forces can be transmitted without having to be afraid that the connection between the attachment jaws and the basic jaws is adversely affected. For, if the basic jaws are equipped with a T or L-shaped projection and the attachment jaws with a recess accommodating it, the attachment jaws can, due to the fact that the outer and inner faces of the mutually engaging parts are concentric to the longitudinal axis of the chuck body, be attached to the basic jaws by a relative rotation between the chuck body and the pallet, and locked to them secure against rotation by means of the holding member. Consequently, a quick exchange of jaws presents no problem with simple manipulations, the twisting travel of the chuck body and/or the pallet to be fed to it centrally being readily settable.

Since the attachment jaws are supported directly by the basic jaw projections, the occurring tilting moments are very small and do not adversely affect the hook-shaped connection. And since the basic jaw projection engages the attachment jaws directly, a great stability is provided also, especially since the attachment jaws are supported in the base of the basic jaw projection. In addition, since the interacting surfaces are concentric to the chuck axis they can be machined precisely without difficulties.

Accordingly it is an object of the invention to provide an improved machine tool chuck which has basic jaws which are engageable with attachment jaws in an arrangement in which the attachment jaws are carried by a pallet which may rotate on a chuck body to engage the attachment jaws with the basic jaws.

A further object of the invention is to provide a chucking device which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a partial elevational and axial sectional view of a chuck body of a chuck equipped with basic jaws in accordance with the invention;

FIG. 2 is a view similar to FIG. 1 of a pallet in which the attachment jaws which are attachable to the basic jaws of the chuck per FIG. 1 are held;

FIG. 3 is a partial top view of one of the attachment jaws per FIG. 2 in arrow direction P;

FIG. 4 is a front elevational view of the chuck body of the chuck of FIG. 1;

FIG. 5 is a sectional view of the chuck body of the chuck per FIG. 1 with attachment jaws attached;

FIG. 6 is a view similar to FIG. 1 of a different embodiment of a basic jaw for a chuck per FIG. 1; and FIG. 7 is a view similar to FIG. 1 of the attachment jaw associated with the basic jaw of FIG. 6, and held in a pallet.

DESCRIPTION OF THE PREFERRED EMBODIMENTS

Referring to the drawings in particular, the invention embodied therein comprises a machine tool chuck generally designated 1 which includes basic jaws 4 mounted on a chuck body 2 which is arranged to receive and engage with attachment jaws 5 which are carried on a pallet 51 which may be rotated in respect to the chuck body to engage the attachment jaws easily with the basic jaw.

The machine tool chuck shown in FIGS. 1, 4, 5 and 6 and designated 1 in each of them has a chuck body 2 in which are machined radially oriented slots 3 distributed evenly over the circumference and in which are inserted arbitrarily adjustable basic jaws 4. To chuck by means of the chuck 1 a workpiece to be machined, attachment jaws 5 are exchangeably held in the basic jaws 4 arranged so as to be evenly distributed over the circumference, as shown in FIG. 5. The slots 3 are closed off inside by a bushing 6 inserted into the chuck body 2.

To retain the attachment jaws 5 on the basic jaws 4, the basic jaws are provided on their faces facing the attachment jaws 5 with a projection 11 of T-shaped section, and the attachment jaws 5 have a laterally open recess 21, one each being coordinated with the projections 11, into which the projections 11 can be introduced by a relative rotation between the chuck body 2 and a pallet 51 in which the attachment jaws 5 are held in sets, for a change of attachment jaws 5. And in the chucking position of the attachment jaws 5 they are firmly locked to the basic jaws 4 by means of a holding member designated 31 in FIGS. 1 through 5 and 41 in FIGS. 6 and 7.

The outer, mutually offset surfaces 12 and 13, oriented radially outward and the surfaces 15 and 16 oriented radially inward as well as the bearing surfaces 14 and 17 of the projections 11, disposed between the former and arranged perpendicular to the axis, are curved concentric to the longitudinal axis A of the chuck body 2; the offset surfaces 22, 23 and 25, 26, respectiveLy oriented inwardly and outwardly and also the bearing surfaces 24 and 27 of the recesses 21 arranged between the former and being perpendicular to the axis are designed in the same manner, an appropriate clearance being provided, of course, so that the projections 11 of the basic jaws 4 can be easily introduced into the laterally open recesses 21 of the attachment jaws 5.

The attachment jaws 5 to be fed to the chuck body 2 are detachably held in correct position in radially oriented slots 52 machined in the pallet 51 which is provided with a seating hole 53 for a feeding member. This purpose is served by spring detents 54 engaging detent holes 29 drilled laterally into the attachment jaws 5. In the embodiment example per FIG. 2, the attachment jaws 5 are additionally plugged onto a pin 55 projecting into the slots 52. In a chucking position, the attachment jaws 5 are locked to the basic jaws 4 by means of a holding member 31, 41, respectively, which is axially movable within limits. To make this possible, the holding member 31 or 41 engages a seating slot 28 machined into a radially oriented face of the recess 21 of the attachment jaws 5 facing the basic jaws 4.

In the embodiment example per FIG. 1, the holding member 31 consists of a detent bolt 32 inserted in a hole 7 centrally drilled into the basic jaws 4, and of a rectangular sliding block 33 which is disposed at the basic jaws's free end and has pilot bevels 36 on both long sides for easy introduction into the seating slot 28 of the attachment jaws 5. This purpose is served by a compression spring 35 which acts upon the detent bolt 32 and is installed in a hole 34 drilled therein and which supports itself against both the detent bolt 32 and an insert 9 which closes the hole 7. The hole 7 is stepped, forming a shoulder 8 against which rests a collar 37 formed on the detent bolt 32. This prevents the holding member 31 from falling out. In addition, the sliding block 32 of the holding member 31 is held in a recess 18 machined in the basic jaws 4 so as to be secure against rotation.

In the embodiment example per FIG. 6, the holding member 41 comprises a piston 42, to which pressure medium can be admitted from both sides and which is installed in a hole 7', and of a sliding block 44 held in the recess 18 of the basic jaw 4 and engaging the seating slot 28 of the attachment jaw 5 in chucking position. The height h of the sliding block 44 is only slightly smaller than the inside width s of the recess 21 of the attachment jaw 5 so that even great laterally directed forces can be absorbed safely, thereby making a twisting motion of the attachment jaws 5 impossible, also about the axis of the basic jaws 4.

Associated with the piston 42 are two pressure chambers 47 and 48 to which pressure medium can be fed alternately through pressure medium channels 49, 50, respectively, machined into the basic jaws 4. Furthermore, a compression spring 46 is installed in a hole 45 drilled into the piston 43 (sic) said spring being supported by the piston and the basic jaw 4 so that the holding member 41 assumes the position shown in FIG. 6, provided no pressure prevails in the pressure chamber 48.

To attach the attachment jaws 5 held detachably in the pallet 51 to the basic jaws 4 of the chuck 1, all that is needed is to move the pallet 51 axially in alignment with the chuck body 2, but slightly twisted relative to the end position, as shown in FIG. 4 in dash-dotted lines so that the sliding blocks 33, 34, respectively, contact the face of the pallet 51 and are pushed back into the projections 11, countering the force of the spring 35, 46,respectively. Then a rotary motion about the longitudinal axis A is to be performed, it being possible to turn either the chuck body 2 and/or the pallet 51 to introduce the projections 11 of the basic jaws 4 into the recesses 21 of the attachment jaws 5. As soon as the jaws 5 are in a chucking position, the sliding blocks 33, 34, respectively, enter automatically the associated seating slots 28, in the embodiment example of FIGS. 1 through 5 only during the detachment of the attachment jaws 5 from the pallet 51 because the holding members 31 are first kept back by the pins 55, that that there is assurance that the attachment jaws 5 are locked with operational reliability to the basic jaws 4. In the embodiment example of FIG. 6, pressure medium can now be admitted to the pressure chamber 47 to make unlocking of the holding member 41 impossible. Upon a subsequent axial motion of the pallet 51 away from the chuck body 2, the detent springs 54 are released and the attachment jaws 5 are accordingly removed from the pallet 51 automatically.

To be able to adjust the twisting travel between the pallet 51 and the chuck body 2 in a simple manner, there are provided in the latter's face one or more slots 19 concentric to the longitudinal axis A of the chuck body 2 and, associated therewith, bolts 56 with a pilot bevel 57 are mounted on the pallet 51. During the feeding motion of the pallet 51 the bolts 56 thus engage the slots 19 so that the end position of the relative rotation between the chuck body 2 and the pallet 51 can be set in this manner without difficulties. If the recesses 21 of the attachment jaws 5 are open on one long side only, the twisting motion can be limited by stopping the projections 11 against the attachment jaws 5.

If the attached attachment jaws 5 are to be changed to chuck a different workpiece, the empty pallet 51 is to be fed axially towards the chuck body 2 so that the attachment jaws 5 engage radially oriented slots 52 and the spring detents 54 can snap into their detent holes 29. In the embodiment example of FIG. 2, the holding members 31 are pushed back by the pins 55, countering the force of the springs 35 in such a manner that the sliding blocks 33 leave their seating slots 28 and the attachment jaws 5 can be detached from the basic jaws 4 by turning them. In the embodiment example of FIG. 6, pressure medium is to be admitted to the pressure chambers 48 for the same purpose of returning the holding members 41 so that they contact the basic jaws 4, wherefor the sliding blocks 44 no longer engage the seating slots 28 so that the attachment jaws 5 can also be removed from the basic jaws 4 through a relative rotation between the pallet 51 and the chuck body 2.

While specific embodiments of the invention have been shown and described in detail to illustrate the application of the principles of the invention, it will be understood that the invention may be embodied otherwise without departing from such principles.

What is claimed is:

1. A machine tool and chuck jaw exchanging device, comprising a check body having a longitudinal axis, a basic jaw radially adjustable in said chuck body, a pallet rotatably movable about said chuck body axis, an attachment jaw engageably held by said pallet and being attachable to said basic jaw upon a relative rotation between said pallet and chuck body, said basic jaw having a face directed toward said attachment jaw with a projection of selected shape cross section corresponding to the shape of said selected cross section, each of said basic jaw and said attachment jaw having radially oriented outer and inner surfaces and bearing surfaces disposed between them perpendicular to and concentric with said longitudinal axis of said chuck body in the attaching position of said attachment jaw, and locking means effective in chucking position of said attachment jaw relative to said basic jaw to lock said jaws secure against rotation.

2. A chuck according to claim 1, wherein said locking means for preventing rotation locking of the attachment jaw relative to said basic jaw includes a holding member axially adjustable with defined limits associated with said attachment jaw, a sealing slot associated with said attachment jaw providing an engagement for said holding member to lock said jaws together.

3. A chuck according to claim 2, wherein said holding member comprising a detent bolt, said basic jaw having a hole eccentrically drilled therein, a sliding block disposed at the free end of said detent bolt engaged in said seating slot of said attachment jaw being rectangular and guided in the recess of said basic jaw secure against rotation.

4. A chuck according to claim 2, including a fluid pressure operated piston, said basic jaw having a hole therein in which said piston is engageable, said piston having a piston rod with a sliding block engageable in said seating slot of said attachment jaw having a rectangular shape portion guided in a recess of said basic jaw secure against rotation.

5. A chuck according to claim 2, wherein said sliding block and said attachment jaw recess accommodating it are provided with pivot bevels preferably machined on their long sides.

6. A chuck according to claim 2, wherein the height of said sliding block is substantially equal to the inner width of said recess in said attachment jaw.

7. A chuck according to claim 2, wherein one of said jaws has a machining therein, at least one slot extending concentric to the longitudinal axis of the chuck body providing means for the adjustment of the relative position between said jaw and said pallet, said pallet having an attachment bolt extending in the slot.

8. A chuck according to claim 7, wherein said bolt is provided with tips having a pivot bevel of conical design.

9. A chuck according to claim 8, wherein the attachment jaw is detachably held in said pallet by means of spring detent means holding said attachment jaw to said pallet.

* * * * *